Sept. 12, 1944.  K. MILLER  2,358,021

MASTER CYLINDER FOR HYDRAULIC BRAKING SYSTEMS

Filed Feb. 2, 1940

Patented Sept. 12, 1944

2,358,021

UNITED STATES PATENT OFFICE 2,358,021

MASTER CYLINDER FOR HYDRAULIC BRAKING SYSTEMS

Kay Miller, Rockford, Ill., assignor to The Atwood Vacuum Machine Company, Rockford, Ill., a copartnership composed of Seth B. Atwood and James T. Atwood Application February 2, 1940, Serial No. 316,896

4 Claims. (Cl. 60—54.6)

This invention relates to hydraulic braking systems and has particular reference to an improved master piston and cylinder mechanism therefor.

The aim of certain improvements in hydraulic braking systems in recent years has been to provide for quick take-up of the slack in the system and obtain the desired braking force with lower brake pedal pressure, whereby to eliminate the use of boosters or any other power type braking means and secure greater safety in addition to easier and generally more satisfactory operation. It is the principal object of my invention to provide a master cylinder having a compound type piston so constructed and so arranged with relation to the braking system and the brake fluid reservoir that the kind of operation desired is obtained in a highly practical and efficient manner and without complicating the construction or adding to the cost appreciably, if any.

The invention is illustrated in the accompanying drawing, in which—

Figure 1:
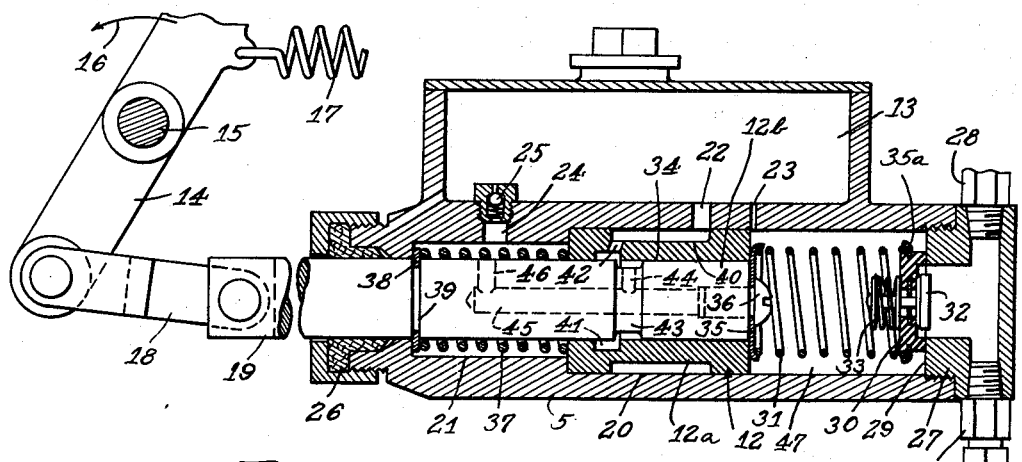
Figure 2:
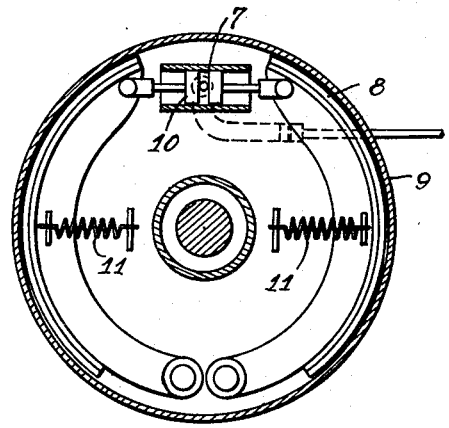
Figure 2:
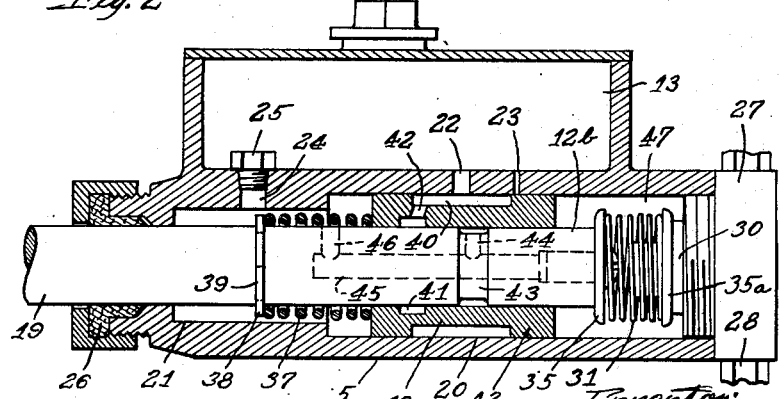

Figure 1 is a longitudinal section through the master cylinder and reservoir equipped with a compound piston constructed in accordance with my invention, the cylinder being illustrated as connected with a brake system and arranged to have its piston operated by a pedal operated lever, and Fig. 2 is a view of the main parts of Fig. 1 in moved positions.

The same reference numerals are applied to corresponding parts throughout the views.

Referring to the drawing, 5 is the master cylinder having conduits 6 extending from the discharge end thereof to the various brake cylinders 7 associated with the brake shoes 8 and the brake drums 9 of the wheels of the vehicle, the shoes 8 being operable under hydraulic fluid pressure from the conduits 6 by pistons 10 in the usual way, and arranged to be retracted by suitable spring means 11. This portion of the brake system is shown diagrammatically inasmuch as the present invention relates primarily to the master cylinder 5 and its compound piston 12, except, of course, in so far as these elements 5 and 12 cooperate with the rest of the brake system, like the braking fluid reservoir 13 and pedal or otherwise manually operated lever 14 in new and patentable combinations. The lever 14 is shown as pivoted at 15 and arranged to be moved manually in a counter-clockwise direction, as indicated by the arrow 16, and to be returned by suitable spring means, indicated at 17. The lever 14 may on the other hand be operated by suitable power means where so desired although, as will soon appear, the compound piston 12 enables such easy manual operation that so-called boosters or other power means are actually not necessary. The lever 14 is shown as connected by means of a link 18 with the outer end of the piston rod 19 of the piston 12.

The cylinder 5 has a main bore 20 and an auxiliary bore 21 of smaller diameter extending from the rear end thereof in coaxial relation thereto. The reservoir 13, which is shown as formed integral with the wall of the cylinder 5 but which may of course be a separate unit, has open communication with the bore 20 through a large port 22 and a small port 23. The auxiliary bore has connection with the reservoir through another port 24 controlled by a spring pressed ball check valve 25, which allows the flow of fluid into the bore 21 from the reservoir under given conditions but not reverse flow. A stuffing box 26 provides a fluid-tight seal for the rear end of the bore 21 around the rod 19. A plug 27 is threaded in and closes the front end of the bore 20 and carries the nipples 28 to which the conduits 6 for the various brake cylinders are connected. A seat 29 is provided on the plug 27 for the usual large return valve 30 that is held seated under action of a coiled compression spring 31. The latter functions to return the piston 12 to retracted position after an application of the brakes. The valve 30 carries an outlet valve 32, which is held closed under light pressure by means of a spring 33.

The compound piston 12 comprises a large diameter outer tubular piston 12a and a small diameter inner piston 12b slidable with a close working fit in the axial bore 34 of the outer piston, the inner piston 12b being illustrated as an integral extension of the rod 19 and carrying a washer 35 on the front end thereof, held by the screw 36 to mount the rear end of the spring 31 and sustain the pressure of this spring independently of the outer piston 12a, as illustrated in Fig. 2. An annular seat 35a on the return valve 30 supports the front end of the spring 31 as shown. The washer 35 also provides a limiting abutment for the outer piston 12a, which is urged forwardly with respect to the inner piston 12b under the action of a coiled compression spring 37 that surrounds the rod 19 and has abutment at its one end against the rear end of the outer piston 12a and abutment at its other end against a split ring 38 snapped into an annular groove 39 in the rod 19. The spring 37 is preloaded to a predetermined extent so as to move the outer piston 12a with the inner piston 12b forwardly until the back pressure of the fluid in front of the piston 12 is sufficient to overcome the pressure of the spring 37, whereupon the inner piston 12b is arranged to be moved forwardly independently of the outer piston 12a to apply the desired high braking pressure with low pedal pressure or other force applied to the rod 19, the inner piston 12b having a much smaller diameter and accordingly much less displacement than the compound piston 12, so as to permit building up the higher pressure desired without applying as much force to the rod 19 as would be required with an ordinary single piston of the same diameter as the piston 12.

The outer piston 12a has a wide annular external groove 40 which communicates with a narrow annular internal groove 41 through one or more radial passages 42. A narrow annular external groove 43 is provided in the inner piston 12b, which communicates through one or more radial passages 44 with a longitudinal passage 45 provided in the inner piston. The front end of this passage 45 is plugged by the screw 36, but the rear end thereof has a radial passage 46 which opens communication to the bore 21.

In operation, the small port 23 connects the compression cylinder 47 with the reservoir 13 when the compound piston 12 is in the retracted position shown in Fig. 1. Under these conditions the large port 22 is in open communication with the bore 21 as follows: It communicates with the front end of the annular external groove 40 in the outer piston 12a, and the external groove 43 in the inner piston 12b is in communication with the internal groove 41 in the outer piston 12a so that communication with the bore 21 is established through passages 44—46. However as soon as the compound piston 12 is moved forward, the compression cylinder 47 is cut off from communication with the reservoir 13 by the outer piston 12a covering the small port 23, and the piston 12 accordingly discharges oil, or whatever other braking fluid is used, from the compression cylinder 47 through the outlet valve 32 and thence through the conduits 6 into the brake cylinders 7, thus forcing the pistons 10 outwardly to apply the brake shoes 8 against the resistance of their springs 11. When the compound piston 12 has been moved enough to take up all or most of the slack in the braking mechanism of the car, there is sufficient back pressure in the compression cylinder 47 to overcome the spring 37 and any further movement of the piston rod 19 will, therefore, cause the inner piston 12b to move forwardly independently of the outer piston 12a in the manner shown in Fig. 2, thereby cutting off communication between the external groove 43 in the inner piston 12b and the internal groove 41 in the outer piston 12a. This is important because it means the locking of the outer piston 12a in its advanced position by the entrapment of oil behind said outer piston. In the forward movement of the compound piston 12 previously described, oil is drawn into the bore 21 from the reservoir 13 partly through the check valve 25 and partly through the port 22, the latter portion of the oil being conducted through groove 40, passage 42, groove 41, groove 43, and passages 44, 45, and 46 into the bore 21. The space behind the outer piston 12a is accordingly filled with oil or other braking fluid and consequently when the groove 43 is cut off from communication with the groove 41, as illustrated in Fig. 2, the oil behind the outer piston 12a is trapped and the piston 12a is accordingly supported against rearward movement under the back pressure of the fluid in the compression cylinder 47. On the other hand, when the brake pedal pressure previously applied to the rod 19 is released, the spring 17 returns the lever 14 and the spring 31 returns the compound piston 12 toward normal retracted position. In this operation the fluid pressure in the compression cylinder 47 is, of course, immediately relieved so that the outer piston 12a moves forward relative to the inner piston 12b under action of the spring 37 to a point where it strikes the washer 35, and hence there is nothing to interfere with the return movement of the compound piston 12, because the oil returns to the reservoir 13 through the same ports and passages communicating with the port 22 through which it entered the bore 21, grooves 41 and 43 being in communication at this time. The functioning of the compound piston 12, it should be clear, is entirely automatic in so far as the point at which the inner piston 12b will commence to move forwardly independently of the outer piston 12a is concerned, because regardless of wear on the brake shoe linings, the compound piston will move forwardly as a whole until all or most of the slack in the mechanism has been taken up and a predetermined back pressure is developed in the conduits 6 and cylinder 47 sufficient to overbalance the spring 37, whereupon the inner piston 12b is free to move forwardly independently of the outer piston 12a. In this independent movement of the inner piston 12b, the spring 37 is, of course, subjected to some further compression. However, this resistance to movement of the brake pedal is more than offset by the mechanical advantage gained with the smaller inner piston.

It is believed the foregoing description conveys a good understanding of the objects and advantages of my invention. The appended claims have been drawn to cover all legitimate modifications and adaptations.

I claim:

1. In a hydraulic apparatus of the character described, the combination of a cylinder having a bore therein with which one or more conduits are adapted to communicate for conducting operating fluid to and from the discharge end of the bore, an outer piston of relatively large diameter movable in the cylinder with a working fit, an inner piston of relatively small diameter extending into the cylinder through an axial bore in the outer piston with a working fit, a coiled compression spring surrounding the inner piston behind the outer piston and acting between a shoulder on the inner piston and the back of the outer piston to cause forward movement of the outer piston with the inner piston, said spring constituting the sole yieldable operating connection between said pistons for such forward movement, a reservoir for operating fluid, intercommunicating ports and passages in the pistons and cylinder for maintaining communication between the reservoir and the bore in said cylinder behind the pistons only so long as the pistons are movable together but arranged to close off that communication when the inner piston moves forwardly relative to the outer piston, the fluid in said cylinder rearwardly of the pistons being trapped when the inner piston is moved forwardly relative to the outer piston thereby preventing rearward movement of the outer piston, said reservoir having communication with the discharge end of the bore in said cylinder through a port in the wall of the cylinder arranged to be closed by the outer piston in its initial forward movement, and means on the front end of the inner piston for limiting forward movement of the outer piston under action of the compression spring and serving to return the outer piston with the inner piston in the rearward movement of the latter.

2. In a hydraulic apparatus of the character described, the combination of a cylinder having a bore therein with which one or more conduits are adapted to communicate for conducting operating fluid to and from the discharge end of the bore, an outer piston of relatively large diameter movable in the cylinder with a working fit, an inner piston of relatively small diameter extending into the cylinder and through an axial bore in the outer piston with a working fit, a coiled compression spring surrounding the inner piston behind the outer piston and acting between a shoulder on the inner piston and the back of the outer piston to cause forward movement of the outer piston with the inner piston, said spring constituting the sole yieldable operating connection between said pistons for such forward movement, a reservoir for operating fluid, intercommunicating ports and passages in the pistons and cylinder for maintaining communication between the reservoir and the bore in said cylinder behind the pistons only so long as the pistons are movable together but arranged to close off that communication when the inner piston moves forwardly relative to the outer piston, said reservoir having communication with the discharge end of the bore in said cylinder through a port in the wall of the cylinder arranged to be closed by the outer piston in its initial forward movement, a washer on the front end of the inner piston for limiting forward movement of the outer piston relative to the inner piston under action of the compression spring and for returning the outer piston with the inner piston in the rearward movement thereof, and another coiled compression spring having engagement at one end on said washer and at its other end in the discharge end of the bore of said cylinder tending to return the pistons after forward movement thereof.

3. In a hydraulic apparatus of the character described, the combination of a cylinder having a bore therein with which one or more conduits are adapted to communicate for conducting operating fluid to and from the discharge end of the bore, an outer piston of relatively large diameter movable in the cylinder with a working fit, an inner piston of relatively small diameter extending into the cylinder and through an axial bore in the outer piston with a working fit, a coiled compression spring surrounding the inner piston behind the outer piston and acting between a shoulder on the inner piston and the back of the outer piston to cause forward movement of the outer piston with the inner piston, said spring constituting the sole yieldable operating connection between said pistons for such forward movement, a reservoir for operating fluid, intercommunicating ports and passages in the pistons and cylinder for maintaining communication between the reservoir and the bore in said cylinder behind the pistons only so long as the pistons are movable together but arranged to close off that communication when the inner piston moves forwardly relative to the outer piston, a supplementary passage for establishing communication between the reservoir and the bore in said cylinder behind the outer piston, a check valve in said passage permitting flow of fluid only from the reservoir to the bore, said reservoir having communication with the discharge end of the bore in said cylinder through a port in the wall of the cylinder arranged to be closed by the outer piston in its initial forward movement, and means on the front end of the inner piston for limiting forward movement of the outer piston under action of the compression spring and serving to return the outer piston with the inner piston in the rearward movement of the latter.

4. In a hydraulic apparatus of the character described, the combination of a cylinder having a bore therein with which one or more conduits are adapted to communicate for conducting operating fluid to and from the discharge end of the bore, an outer piston of relatively large diameter movable in the cylinder with a working fit, an inner piston of relatively small diameter extending into the cylinder and through an axial bore in the outer piston with a working fit, a coiled compression spring surrounding the inner piston behind the outer piston and acting between a shoulder on the inner piston and the back of the outer piston to cause forward movement of the outer piston with the inner piston, said spring constituting the sole yieldable operating connection between said pistons for such forward movement, a reservoir for operating fluid, intercommunicating ports and passages in the pistons and cylinder for maintaining communication between the reservoir and the bore in said cylinder behind the pistons only so long as the pistons are movable together but arranged to close off that communication when the inner piston moves forwardly relative to the outer piston, said reservoir having communication with the discharge end of the bore in said cylinder through a port in the wall of the cylinder arranged to be closed by the outer piston in its initial forward movement, a fluid return valve for closing a discharge port in the discharge end of the bore in said cylinder, a spring abutment on the front end of the inner piston for limiting forward movement of the outer piston relative to the inner piston under action of the aforesaid compression spring and serving to return the outer piston with the inner piston in the rearward movement of the latter, another coiled compression spring seating at one end on the spring abutment and having its other end holding the fluid return valve seated, said spring tending to return the pistons after forward movement thereof, and a spring check valve in the return valve permitting discharge of fluid under pressure from the cylinder.

KAY MILLER.